3,632,549
PROCESS FOR THE PREPARATION OF COMPOSITIONS OF SYNTHETIC DIENE POLYMERS HAVING IMPROVED GREEN STRENGTH AND PROCESSABILITY
Gerardus E. La Heij and Gerrit J. van Amerongen, Amsterdam, Netherlands, assignors to Shell Oil Company, New York, N.Y.
No Drawing. Filed May 6, 1968, Ser. No. 727,055
Claims priority, application Great Britain, June 16, 1967, 27,817/67
Int. Cl. C08f 45/44
U.S. Cl. 260—32.6                    2 Claims

ABSTRACT OF THE DISCLOSURE

Both the processability and the green strength of compositions comprising synthetic carboxylic group-free diene solutions rubbers (e.g., lithium-catalyzed polyisoprene, SBR or cobalt-catalyzed polybutadiene) and reinforcing fillers are improved by using as promoter minor amounts of organic nitrogen compounds having at least one $NH_2$ group, more than 10 carbon atoms, at least one straight chain containing at least 8 carbon atoms and a molecular weight of less than 15,000.

---

The invention relates to a process for the preparation of compositions comprising synthetic, solid, carboxyl-group-free solution polymers of dienes. The invention also relates to shaped objects made by applying the said process or compositions. "Solution polymers" are understood to be polymers prepared in dissolved condition. Diene polymers comprise not only homopolymers, but also copolymers of dienes. As a rule compositions are envisaged comprising more than 30% by weight of the said polymers. The term "copolymers" comprises polymers which in addition to diene units also contain units of one or more other monomers. As a rule these other monomers are also hydrocarbons, for example, dienes or styrene; however, monomers with functional polar groups, except carboxyl groups, may also be incorporated as comonomers. As "solid" polymers are regarded, the polymers whose intrinsic viscosity, measured at 30° C. in toluene, is at least 0.7 dl./g.

The invention in particular relates to the preparation of compositions of solid diene polymers prepared in solution, in which at least 40% and preferably at least 80% of the diene units are bound by cis-1,4 addition (determined by means of nuclear spin resonance).

Suitable diene polymers are especially homopolymers and copolymers of isoprene prepared in solution, in particular if they have been prepared by means of a lithium hydrocarbyl compound.

However, the process according to the invention can, if desired, also be applied very suitably to solution polybutadienes prepared by means of cobalt or nickel compounds together with aluminum alkyl compounds, and to copolymers of butadiene with styrene prepared in solution, again by means of a lithium hydrocarbyl compound. Other suitable polymers are solution polymers of dienes obtained by means of metallic sodium, such as sodium polybutadienes or "Alfin" diene polymers. Finally, the said compositions can also be obtained from polymers prepared in solution in the presence of catalysts donating free radicals.

The process according to the invention now aims at preparing from the said polymers compositions which have not only improved processability on the mill, but which can also be readily and rapidly mixed with fillers and other additives and which in addition, after being mixed with one or more reinforcing fillers, yield compositions which in unvulcanized condition have a very satisfactory tensile strength ("green strength").

Now, in accordance with the present invention, it has been found that these aims can be achieved by mixing the polymers to be improved with a small quantity of one or more organic nitrogen compounds having (1) at least one $NH_2$ group, (2) a total number of more than ten carbon atoms, (3) at least one monovalent or higher valent acyclic organic radical containing a straight chain of at least eight carbon atoms, which chain may or may not be interrupted by one or more hetero atoms and which may not carry one or more side chains and (4) a molecular weight of less than 15,000.

When mixtures of organic nitrogen compounds are used, the molecular weight is understood to be the average molecular weight. If mixtures of organic nitrogen compounds with a polymeric character are used, the molecular weight is understood to be the number average molecular weight, determined by means of vapor pressure osmometry.

Compositions are known which consist of a diene polymer, an aromatic extender oil and a small quantity of a polyethylene polyamine with an average molecular weight of 200–500, or of amino amides formed therefrom with $C_{12}$–$C_{18}$ fatty acids, or of a mixture of the two. The presence of these organic nitrogen compounds was to counteract the adverse effect of the aromatic extender oil on the stability of the composition, as regards oxidation and thermal decomposition.

The adverse effect of aromatic oil becomes noticeable only when relatively large quantities of this oil are used. Although as a rule 15 to 50 parts by weight of the extender oil per 100 parts by weight of rubber are normally used, any plasticizing amount can be used which is found suitable for the envisaged processing. However, the presence of plasticizing amounts of aromatic oils results, even if polyethylene polyamines or the amino amides are present, in a considerable decrease in tensile strength, not only of the unvulcanized compositions with reinforcing fillers ("green strength"), but also of the vulcanized compositions without reinforcing fillers ("gum tensile").

A "plasticizing amount" is understood to be a quantity which results in a decrease in "gum tensile" of more than 10%. This quantity is in general at least 10 percent by weight, and as a rule more than 15 percent by weight based on rubber. The process according to the present invention does not relate to the preparation of the compositions envisaged according to the prior art process just described.

It can by no means be derived from the literature that these amines, in the absence of a plasticizing quantity of aromatic extender oil, considerably improve the processability of the rubber and also the tensile strength of the still unvulcanized compositions with reinforcing fillers.

Another use of polyethylene polyamines contemplates the maximum number of 40 carbon atoms in the amines, but the diene polymer must contain 0.001–0.30 chemical weight equivalents of bound carboxyl per 100 parts by weight of polymer; besides, of the carboxyl groups at least ⅒ part must be allowed to react with formation of polymeric amido carboxylates or polymeric imido carboxylates. Also this does not suggest anything about the effects envisaged and obtained in the compositions according to the present invention. Indeed, the last-mentioned compositions are prepared from carboxyl-group-free diene polymers, so that reactions of amines with carboxyl groups cannot take place.

Finally, reference is made to another prior art process relating to the mixing of rubbers with carbon black and with small quantities of amines containing two $NH_2$ groups. This is said to facilitate the processing of the rubber with the carbon black. Representative amine promoters, all of which are fairly volatile and therefore fairly poisonous, comprise both amines with aromatically bound $NH_2$ groups and amines with aliphatically bound $NH_2$ groups. Insofar as the $NH_2$ groups are bound aliphatically, the amines contain less than 10 carbon atoms, and insofar as the $NH_2$ groups are substituents in aromatic rings, the amines do not contain an acyclic organic radical with a straight chain of at least eight carbon atoms. No tensile strength data of the still unvulcanized compositions in question are known, but a shorter mixing time, more rapid vulcanization and improvement of certain properties of the vulcanizates are mentioned as advantages of these compositions as compared with corresponding compositions without amines.

It has been found that the use of promoters according to the invention considerably improves the processing properties of the composition, in particular the time necessary to obtain homogeneous vulcanizable mixtures with reinforcing fillers and the tensile properties of these mixtures in unvulcanized condition, in comparison with the use of other types of organic nitrogen compounds.

An additional very important advantage of the use of the organic nitrogen compounds according to the invention in comparison with the known amine promoters is that they are more readily miscible with the diene polymers and, owing to their lower volatility, also reduce the risk of poisoning.

The invention can be defined as relating to a process for preparation of compositions comprising one or more synthetic solid carboxyl-group-free diene solution polymers, which process comprises mixing these polymers with a minor amount of one or more organic nitrogen compounds having (1) at least one $NH_2$ group; (2) a total number of more than 10 carbon atoms; (3) at least one acyclic organic radical containing a straight chain of at least 8 carbon atoms, which chain may be interrupted by 1 or more hetero atoms, and (4) a molecular weight of less than 15,000. The minor amount corresponding with less than 10 parts by weight of $NH_2$ groups (preferably 0.01–1 part) per 100 parts by weight of the diene polymers, with the proviso that if the organic nitrogen compounds in these compositions are polyethylene polyamines having a molecular weight within the range of 200–500 or amino amides formed therefrom with $C_{12}$–$C_{18}$ fatty acids, or mixtures of the two, no plasticizing amounts of aromatic extender oil are included in these compositions, either before, during or after their preparation.

The $NH_2$ groups of the aforementioned category of the organic nitrogen compounds may in general be bound aliphatically, cycloaliphatically or aromatically. The compounds with aliphatically bound $NH_2$ groups may, in addition to the acyclic hydrocarbon radical, also contain one or more aromatic and/or one or more cycloaliphatic rings.

Preferably, organic nitrogen compounds are used which contain at least two $NH_2$ groups. If desired, in addition to one or more $NH_2$ groups, also one or more NH groups may be present and in general those nitrogen compounds are preferred in which any nitrogen atoms present in addition to those of the $NH_2$ group or $NH_2$ groups form part of a secondary or tertiary amino group.

In addition to those nitrogen-containing groups, one or more other groups may occur in the organic nitrogen compounds, for example, OH groups, ester groups, ether groups, carbonyl groups. Although the $NH_2$ groups are preferably amino groups, the invention also relates to the use of promoters of which one or more of the $NH_2$ groups are amido groups. The total number of carbon atoms is preferably at least 20.

Very suitable representatives of the organic nitrogen compounds applied according to the invention include the higher aliphatic monovalent or polyvalent amines, including the higher polyethylene polyamines, for example, those with 11 to 500 carbon atoms and a molecular weight of less than 15,000. Preferably the number of carbon atoms of these polyethylene polyamines is 20–500. In particular may be mentioned, reaction products of, on the one hand, an organic nitrogen compound having at most 10 carbon atoms and at least 2 $NH_2$ groups with, on the other hand, an organic compound containing at least 1 atom or group which is reactive towards an $NH_2$ group, such as a halogen-containing paraffin or a low-molecular-weight halogen-containing hydrocarbon polymer, such as a halogenated low-molecular-weight polymer of a butene, in particular of isobutene. Another suitable example of an organic compound with at least one group reactive towards an $NH_2$ group is a reaction product of a low-molecular-weight polymer of isobutene or of a mixture of butenes, with maleic anhydride. As organic nitrogen compounds with at most 10 carbon atoms one chooses as a rule a diamine such as ethylene-diamine or a low-molecular-weight polyethylene polyamine, for example, diethylenetriamine, triethylenetetramine or tetraethylenepentamine.

An example of a polymeric amine prepared in such a way is obtained by reacting a polyisobutene with maleic anhydride and converting the reaction product thus obtained with tetraethylene-pentamine.

Instead of reacting the above-mentioned chlorine containing compounds with lower polyamines, one can also use $NH_3$ for the preparation of the envisaged amino compounds.

Besides, instead of the said higher amines also their salts, for example, their carbamates, can be used as promoter according to the invention.

The diene polymers can be mixed with the organic nitrogen compounds in solution or in the absence of a solvent during compounding, in which case the promoter is preferably added first.

In the promoter-containing compositions of the diene polymers thus prepared preferably one or more reinforcing fillers are incorporated. Although the reinforcing fillers are preferably mixed with compositions which already contain the organic nitrogen compounds according to the invention, the present novel process also comprises the simultaneous mixing of the diene polymers with reinforcing fillers and the promoters and, in addition, the subsequent incorporation of the organic nitrogen compounds in mixtures of the diene polymers with reinforcing fillers.

Examples of reinforcing fillers are the various carbon blacks which are commercially known, for example, as: HAF, ISAF, SAF, SRF, HMF, CF, FF, FEF, EPC, MPC, HPC and CC, including the various structure variants (for example, "low structure" and "high structure") in which a number of these grades of blacks occur. Also carbon blacks which have been subjected to an oxidative after-treatment are suitable; besides, also the non-carbon black reinforcing fillers such as hydrated silica and silicates. If desired the compositions may in addition contain one or more of the following substances: finely divided calcium carbonate, kaolins, resins, low molecular weight hydrocarbon polymers (such as low molecular weight polymers of isobutene or isoprene), hydrocarbon oils, dyes, etc.

The reinforcing fillers are as a rule incorporated in the compositions of the diene polymers with the organic nitrogen compounds at elevated temperature, for example, at 70–150° C. The temperature at the end of this mixing procedure should preferably be increased to 140–180° C.

The mixture to be vulcanized preferably contains also an antioxidant. Insofar as antioxidants of the amine type are chosen it is desirable that these should not be added until the organic nitrogen compounds applied according to the invention have been incorporated. The favorable promoter effect of the last-mentioned compounds is in that case not lowered by the amine antioxidants.

As a rule, after also vulcanizers have been added and mixed with the other components, the composition thus obtained is left undisturbed for some hours, for example, 24 hours, and then once more mixed on the mill.

The compositions according to the invention comprise both the unvulcanized mixtures without fillers and the unvulcanized mixtures with fillers, in particular those comprising reinforcing fillers, and also the vulcanized mixtures with reinforcing fillers.

The compositions according to the invention are suitable for the preparation of vulcanized shaped objects with improved properties, such as car tires, shoe soles, tubing, sheets, strips and the like.

EXAMPLE I

An amine promoter was prepared by adding 544 parts by weight of a mixture of chlorinated paraffins with 22 carbon atoms and a chlorine content of about 46 percent by weight, while heating to 120° C. and stirring, to 721 parts by weight of diethylenetriamine (DETA). To the reaction mixture was also added 500 parts by weight of water-free $K_2CO_3$ to bind the HCl liberated during the reaction. The reaction was continued for 4 hours, after which the unconverted DETA was removed from the mixture by distillation at reduced pressure at a liquid temperature of 95° C. After the potassium salts had been separated by filtration an amine was obtained with 34 carbon atoms, a basic nitrogen content of 10.9 percent by weight, 2 $NH_2$ groups and a number average molecular weight of about 700.

Of this amine promoter 2 parts by weight were mixed with 1000 parts by weight of a 10 percent by weight solution of a lithium polyisoprene in a mixture of isomeric amylenes. This isoprene rubber had an intrinsic viscosity of 8.2 (measured in toluene at 30° C.) and had been obtained by polymerization of isoprene in the presence of sec-butyl lithium in the said mixture of amylenes. The rubber solutions also contained, calculated on rubber 0.03 percent by weight of 3,5-ditert-butyl-4-hydroxybenzyl alcohol as antioxidant. After mixing with the promoter the solvent was removed by steam distillation at atmospheric pressure and the solid mixture of rubber promoter and antioxidant obtained was dried for 10 hours at 50° C. in vacuum.

Part of the rubber sample thus obtained was used to measure the time necessary to reach optimal dispersion of HAF black, for which purpose use as made of a "Brabender Plastograph" as described by C. C. McCabe in Trans. Soc. Rheology 4 (1960) 335-46. The cup present in this apparatus was provided with a cam kneader. The determination was carried out at a rotor speed of 56 r.p.m. The quantity of rubber sample was 40 grams, the quantity of HAF black to be mixed with it 20 grams. Together with the HAF black 0.8 g. of stearic acid and 2.0 g. of ZnO were also added. For reference purposes the measurement was also performed on a rubber sample differing from the above-described sample only in that it did not contain a promoter, and on a rubber sample containing 0.5 part by weight of DETA instead of the above amine promoter according to the invention.

The time thus measured was 7.5 minutes for the sample with amine promoter according to the invention, 14 minutes for the sample without a promoter and 20 minutes for the sample with DETA as promoter.

Subsequently another quantity of 40 g. of the aforementioned sample of rubber, promoter according to the invention and antioxidant, was used to prepare a composition with HAF black prepared according to the following recipe, the data being expressed in parts by weight:

| | |
|---|---|
| Rubber sample | 100 |
| Stearic acid | 3 |
| HAF black | 50 |
| ZnO | 5 |
| A naphthenic rubber extending oil | 5 |
| N-isopropyl-N'-phenyl-para-phenylene diamine | 1 |
| Polymerized trimethyldihydroquinoline, obtained by reaction of aniline with acetone | 1 |
| Sulfur | 2.25 |
| (N,N-oxydiethylene)2-benzothiazole sulpheneamide | 0.7 |

These constituents were mixed at 78° C. on an open Schwabenthan mill with two cylinders having a diameter of 8 cm., a length of 20 cm. and an effective length of 14 cm.

In the same way a composition was prepared without a promoter, but which was identical in other respects.

The unvulcanized compositions thus obtained were pressed at 80° C. for 5 minutes to sheets with a thickness of 2 mm. The tensile properties of the sheets were then measured according to the procedure of ASTM D 412-62 T, using die C. The results are summarized in Table I.

TABLE I.—TENSILE PROPERTIES OF UNVULCANIZED COMPOSITIONS CONTAINING HAF BLACK

| | Without promoter | With the chlorinated wax-DETA reaction product as promoter |
|---|---|---|
| Yield stress, kg./cm.$^2$ | 3.9 | 4.0 |
| Elongation at yield, percent | 60 | 60 |
| Tensile strength, kg./cm.$^2$ | 0.6 | 7.4 |
| Elongation at break, percent | 290 | 860 |

EXAMPLE II 40 parts by weight of a saturated aliphatic primary monoamine with 22 carbon atoms, were dissolved in 20,000 parts by weight of the antioxidant-containing 10 percent by weight solution of polyisoprene in a mixture of isomeric amylenes described in Example I, after which the solvent was removed in the same way as mentioned in Example I. For reference purposes a sample without promoter and a sample with a corresponding quantity of n-pentylamine were also prepared.

On these samples the time required to obtain optimal dispersion of HAF black was measured in the manner described in Example I. For the sample with the $C_{22}$ promoter a time of 7 minutes was found, for the sample without promoter a time of 16 minutes, while the time for the sample with n-pentylamine was 20 minutes.

Subsequently a 1.8-kg. quantity of the sample with the $C_{22}$ promoter and a similar quantity of the sample without promoter were used to prepare compositions with HAF black according to the recipe of Example I by mixing in a Homrich "internal mixer" (capacity 2.5 liters). For this purpose the mixer was first heated to 90° C. and set at a speed of the kneading arms of 110 r.p.m., then filled with the rubber sample and closed. After mixing for 0.5 minute half of the required quantity of HAF black and all the required ZnO and stearic acid were added and mixed for 1.5 minutes. Then the balance of the HAF black and the naphthenic oil were incorporated, again while mixing, which was now continued for another 4 minutes, the temperature of the composition rising to 180° C.

The mixture thus obtained was transferred to a 2-cylinder Berstorff mill with a cylinder diameter of 30 cm., a total length of 70 cm. and effective length of 61 cm. When the temperature of the composition had dropped to 70° C., the polytrimethyldihydroquinoline, diamine, the sulfur and the sulpheneamide were added at this temperature.

After a mixing time of 15 minutes the mixture was removed from the mill, stored for 24 hours and then once more homogenized on the same mill, now for 10 minutes, again at a mill temperature of 70° C.

The unvulcanized compositions were then pressed at 80° C. to 2-mm. sheets, after which the tensile properties were measured as described in Example I. The results are given in Table II.

TABLE II.—TENSILE PROPERTIES OF COMPOSITIONS CONTAINING HAF BLACK

|  | Without promoter | With promoter |
|---|---|---|
| Yield stress, kg./cm.² | 3.5 | 2.6 |
| Elongation at yield, percent | 80 | 70 |
| Tensile strength, kg./cm.² | 0.7 | 3.7 |
| Elongation at break, percent | 310 | 980 |

EXAMPLE III 40 parts by weight of the reaction product of chlorinated wax with DETA mentioned in Example I were mixed as promoter with 20,000 parts by weight of the antioxidant-containing 10 percent by weight solution of polyisoprene in a mixture of isomeric amylenes, also mentioned in Example I, after which in the same manner as described in Example I the solvent was removed. Once more, for reference purposes a sample without promoter was made in a similar way.

Subsequently each of these two samples were used in the same way as mentioned in Example II to make a HAF-black-containing composition, the difference being that the initial temperature of the "internal mixer" was 80° C. and that the second mixing step in this mixer took 5 minutes as a result of which the final temperature of the composition measured as 160° C.

In the same way as described in Example II the composition was then transferred to the Berstorff mill and mixed at 70° C. with the same recipe curing additives. Once more sheets were pressed from the still unvulcanized mixtures, after which the tensile properties were determined. The results are listed in Table III.

TABLE III.—TENSILE PROPERTIES OF UNVULCANIZED COMPOSITIONS CONTAINING HAF BLACK

|  | Without promoter | With chlorinated wax-DETA reaction product as promoter |
|---|---|---|
| Yield stress, kg./cm.² | 3.2 | 2.7 |
| Elongation at yield, percent | 60 | 60 |
| Tensile strength, kg./cm.² | 0.6 | 6.1 |
| Elongation at break, percent | 240 | 1180 |

We claim as our invention:

1. A process for improving the green strength and processability of synthetic polyisoprene rubber having a cis 1,4-content of at least 40% which consists essentially in subjecting the rubber to rubber milling conditions in the presence of an effective amount of the reaction product of a chlorinated paraffin wax and a polyalkylene polyamine, said reaction product being obtained by reaction of 544 parts by weight of a chlorinated paraffin having an average of about 22 carbon atoms and a chlorine content of about 46% by weight with 721 parts by weight of a polyalkylene polyamine, the product having an average of about 34 carbon atoms, a basic nitrogen content of 10.9% by weight, an average of two $NH_2$ groups per molecule and a number average molecular weight of about 700.

2. A process according to claim 1 in which the polyalkylene polyamine is diethylene triamine and the reaction product is present in an amount of about 2% by weight, based on polyisoprene.

References Cited

UNITED STATES PATENTS

| 3,171,821 | 3/1965 | Sherman et al. | 260—32.6 A |
| 3,177,254 | 4/1965 | Rogier et al. | 260—45.9 |
| 3,244,666 | 4/1966 | Sharpe | 260—45.9 B |
| 3,254,043 | 5/1966 | Trott | 260—32.6 A |

OTHER REFERENCES

Rubber World—Materials and Compounding Ingredients for Rubber and Plastics (New York) (1965), page 49. TS 1890 I 53.

MORRIS LIEBMAN, Primary Examiner

H. H. FLETCHER, Assistant Examiner

U.S. Cl. X.R.

260—45.9 R, 34.2, 94.7 N, 583 R, 583 P, 585 A